United States Patent [19]

Hahn et al.

[11] Patent Number: 5,319,026

[45] Date of Patent: Jun. 7, 1994

[54] CURE ORIENTATION BY INCORPORATION OF CURATIVES INTO A CARRIER

[75] Inventors: Bruce R. Hahn, Hudson; Judith A. Tweedie, Uniontown, both of Ohio

[73] Assignee: The Goodyear Tire & Rubber Company, Akron, Ohio

[21] Appl. No.: 55,476

[22] Filed: May 3, 1993

[51] Int. Cl.$^5$ ................................. C08F 8/00
[52] U.S. Cl. ................................. 525/192; 525/191; 525/199; 525/194; 525/196; 525/213; 525/217; 525/232; 525/237; 525/240; 525/241; 428/323
[58] Field of Search .............. 525/192, 191, 199, 194, 525/196, 213, 217, 232, 237, 240, 241; 428/323

[56] References Cited

U.S. PATENT DOCUMENTS 4,894,281  1/1990  Yagi et al. ..................... 525/92

*Primary Examiner*—John Kight, III
*Assistant Examiner*—Dvc Truong
*Attorney, Agent, or Firm*—David E. Wheeler

[57] ABSTRACT

In order to increase the modulus properties of a rubber compound it is desirable to achieve control of the cure morphology within a rubber matrix. The placement of curatives in a rubber matrix can be controlled by incorporating the curatives into a carrier and mixing the carrier with a rubber compound. In a preferred embodiment, the carrier can be made having the morphology of a short fiber, and the curatives can be oriented like a short fiber.

11 Claims, No Drawings

CURE ORIENTATION BY INCORPORATION OF CURATIVES INTO A CARRIER

BACKGROUND

The invention relates to a method of reinforcing or increasing the modulus of an elastomeric matrix, and an elastomeric matrix made by the method.

The main benefit of including short fibers in an elastomeric matrix is the large increase in low strain moduli demonstrated by the elastomer. This increase in modulus can be achieved using low levels of fibers. This is due to the rheological differences between an elastomer reinforced using short fibers, as compared to such properties in an elastomer matrix that is reinforced with spherical or particulate type fillers. The expected improvement in modulus can be calculated using the semi-empirical Guth-Gold equation, $$h = h_o(1 + 0.67fc = 1.62f^2c^2),$$

where h is the viscosity of the composite, $h_o$ is the matrix viscosity, f is the aspect ratio (1/d) and c is the volume concentration. From this equation, it can be seen that increasing aspect ratio (at constant concentration) is the main factor of short fiber reinforcement in an elastomeric matrix, regardless of the type of material used.

One of the disadvantages of using short fiber reinforcement is that the short fibers are a foreign material in an elastomer matrix, and there is not perfect adhesion between the short fibers and the matrix. Consequently, over a long period of time, as the elastomer works, the short fibers separate from the elastomer in which they are embedded, because the fibers do not flex in the matrix in the same way as the elastomer molecules. When the fibers become separated from the elastomer, their presence becomes detrimental to the properties of the elastomer.

Accordingly, it is an object of this invention to provide a method of reinforcing an elastomer that does not rely on the presence of short fibers or other reinforcing material. It is also an object of the invention to provide a modulus gradient in an elastomer around fiber type materials in order to minimize the difference in modulus between the fiber and an elastomeric matrix, in order to minimize the separation of fiber reinforcement from its elastomeric matrix.

Other objects of the invention will be apparent from the following description and claims.

SUMMARY OF THE INVENTION

A method of forming domains of high crosslinking density in an elastomer matrix is provided. The method comprises the steps of (a) loading a carrier having a melting point above the mixing temperature of a green elastomer and below the curing temperature of said elastomer with 10% to 40% by weight curing agents, (b) forming the carrier into fibers having an aspect ratio of 1-100, (c) mixing the fibers with the green elastomer, and (d) curing the elastomer, thereby causing the diffusion of the curatives from the fibers into the elastomer.

In an illustrated embodiment, the carrier is a polyalkylene or a substituted polyalkylene. It is preferred that the carrier fibers have a diameter of 0.0010 to 0.050 inch and an aspect ratio of 1 to 100, and be mixed into the elastomer at a concentration of 1 to 20 phr. It is also preferred that the fibers be oriented in the elastomer matrix.

Also provided is an elastomer matrix, made according to the invention, that has therein domains of high density crosslinking. In a preferred embodiment the domains have a modulus gradient where the density of crosslinking at a central region of a domain is higher than the density of crosslinking at an outer portion of the domain. The domains have an aspect ratio of 1 to 80 and are preferably oriented. The domains comprise 5 to 20 volume percent of the matrix.

DETAILED DESCRIPTION OF THE INVENTION

In general, as the crosslink density of an elastomer increases, the modulus increases. Cross linking density can be increased by increasing the concentration of curatives in an elastomer formulation.

Short fiber reinforcement in rubber compounds is achieved through the compounding of short fibers into the rubber compound. In order to achieve modulus enhancement, the fibers must have modulus values higher than the vulcanized elastomer in which they are used, and the benefits realized by using the fibers is increased as the aspect ratio of the fibers increases.

Taking into consideration the requirements for fiber reinforcement from the Guth-Gold equation, and the high modulus values obtainable from highly crosslinked rubber, the inventors theorized, in the conception of this invention, that another way to achieve short fiber type reinforcement is to have short fiber-like areas of high cross-link density within an elastomer matrix.

Curatives, which control the amount of crosslinking in a curable elastomer, are frangible or monomeric, and do not have the structural integrity needed to form a shape or entity which can survive, intact, during its mixing into an elastomer.

In accordance with the present invention, it has been found that curatives can be mixed into an elastomer in a form that has structural integrity if high concentrations of the curatives are incorporated into a carrier that can survive the mixing process.

In an illustrated embodiment, the curatives have been incorporated into a polymer that can be formed into fibers. The polymer containing the curatives can be extruded and spun into fibers using conventional techniques known to those skilled in the art. The fibers can be chopped into short fibers, and mixed into an elastomer formulation.

Preferably the fiber forming polymer will have a melting temperature above the elastomer mixing temperature, but below the elastomer curing temperature. This allows for normal mixing of the short fibers into the elastomer, yet permits melting of the fibers during cure so that the curatives can be released into the elastomer matrix. In such a case, the polymer acts solely as a carrier to load the curatives into the rubber and to control the morphology of the curatives in the rubber. The curatives will diffuse out of the fibers during the cure stage and create fiber like areas with high cross-link densities.

Examples of curing agents that can be used in the invention include sulfur, stearic acid, zinc oxide, amine accelerators, sulfenamide accelerators, and mixtures thereof. Examples of amine accelerators include di-substituted guanidine, such as diphenyl guanidine. Examples of sulfenamide accelerators include substituted benzothiazole-2-sulfenamide, wherein the substituents are exemplified by alkyl of 1 to 8 carbons, such as cyclohexyl, and oxydiethylene.

When the elastomer cools, the polymeric material used as the carrier in the illustrated embodiment, returns to solid form, and has some effect on the overall properties of the elastomer. The advantage of the method of the invention, however, is that the proper diffusion of curatives into the elastomer provides a modulus gradient in the proximity of the carrier fiber, with a higher modulus in the area of the carrier fiber, and a gradually lower modulus in the elastomer, as a function of the distance from the fiber. Such a gradient of modulus is expected to result in an improved mechanical miscibility between the elastomer matrix and the polymer of the fiber (i.e. it is expected that there will be fewer separations between the fiber and the matrix during the use of the elastomer, because energy which would ordinarily cause separation of the fiber from the matrix tends to be absorbed in the high modulus elastomer around the fiber).

Those skilled in the art will recognize that if a carrier can be found which dissipates into the elastomer when it is cured, or develops a modulus when the elastomer is cured that is similar to the modulus of the elastomer, or if a curative can be found that has physical integrity which would survive its mixing into an elastomer, that an elastomer matrix can be made which has properties like a short fiber reinforced elastomer, without using any short fiber reinforcement.

Accordingly, the method comprises the steps of (a) loading a carrier having a melting point above the mixing temperature of a green elastomer and below the curing temperature of said elastomer with 10% to 40% by weight curing agents, (b) forming the carrier into fibers having an aspect ratio of 1-100, (c) mixing the fibers with the green elastomer, and (d) curing the elastomer, thereby causing the diffusion of the curatives from the fibers into the elastomer.

The carrier must be a substance which is capable of holding large amounts of curatives yet still be capable of being extruded, and preferably drawn into a fiber, and maintain its shape when mixed into an elastomer. The carrier must have properties whereby the curatives are released from the carrier when the carrier melts.

In an illustrated embodiment, the carrier is a polyalkylene or a substituted polyalkylene. Examples of other carriers that can be used in the invention are polyacrylates, polyesters, polyethers, and syndiotactic polybutadiene.

The carrier fibers may have a diameter of 0.0010 to 0.050 inch, preferably 0.005 to 0.02 inch, and an aspect ratio of 1 to 100, and be mixed into the elastomer at a concentration of 1 to 20 phr. It is preferred that the fibers be oriented in the elastomer matrix.

Several methods of orienting fibers in an elastomer matrix are well known to those skilled in the art. For example, fibers may be oriented (i.e. aligned substantially parallel to one another) simply by milling or extruding the elastomer.

Also provided is an elastomer matrix, made according to the invention, that has therein domains of high density crosslinking. In a preferred embodiment the domains have a modulus gradient where the density of crosslinking at a central region of a domain is higher than the density of crosslinking at an outer portion of the domain.

Since the greatest concentration of curatives in the carrier fiber will be along its length, the aspect ratio of the high crosslink density domains in the elastomer matrix will not be as great as the aspect ratio of the fibers (there will be less diffusion of curatives from the ends of the fibers). Accordingly, it is believed that the aspect ratio of the high cross link density domains in the elastomer will be about 80% of the aspect ratio of the fibers, and in the illustrated embodiment, the domains will have an aspect ratio of 1 to 80.

In order that tensile strength of the elastomer is maintained, it is preferred that the volume percentage of high crosslink density domains in the elastomer be kept below 20%. Accordingly, it is preferred that the high crosslink density domains comprise 1 to 20 volume % of the elastomer matrix.

It is preferred that the elastomer used in the invention is a rubber composition.

Examples of other elastomers which can be used in the invention include polyisoprene rubber, styrene butadiene rubber (SBR), polybutadiene rubber, nitrile rubber, and mixtures thereof.

The invention is further illustrated with reference to the following examples.

EXAMPLE 1

In order to test the concept of the invention, and achieve orientation of the curatives, the curatives were extruded with polyethylene into a continuous fiber and then drawn and chopped. The polyethylene used has a melting temperature ($T_m$) of 112° C. The polyethylene is used solely as a carrier for the curatives. The fibers were mixed into the rubber formulation during the productive stage. Polyethylene was chosen because its $T_m$ is greater than the mixing temperature of the elastomer, but lower than its cure temperature. The fibers maintain their integrity during the mixing, but the curatives diffuse into the rubber during curing. The morphology of the curatives is controlled by the size and shape of the fibers.

Experimental Procedure: A low density polyethylene(500G), $T_m = 112C$, with a melt index of 3.6 was placed into a Haake extruder with a cure package consisting of 114 g sulfur, 33 g of accelerators, 3.5 g of stearic acid and 3.5 g of zinc oxide. The mixture was extruded at 140° C. through a 50 mil, 40/1 l/d die. The resulting fiber was drawn 6× and chopped into fibers approximately 12 mm long. These fibers were then mixed at 2 and 5 phr into the following rubber formula:

| Ingredient | Type | Amount in phr |
|---|---|---|
| 1. cis,1,4-polyisoprene | elastomer | 25 |
| 2. SBR | elastomer | 75 |
| 3. carbon black, general purpose tread | filler | 45 |
| 4. petroleum process oil | plasticizer | 9 |
| 5. N-phenyl-N'-(1,3 dimethyl/butyl) N-phenyl-P-phenylenediamine | antidegradant | 2 |
| 6. mixed diaryl-P-phenylene diamine | antidegradant | 1 |
| 7. paraffinic/micro crystalline wax | processing aid | 1 |
| 8. stearic acid | activator | 3 |

Brabender Mixer Compounding.

A Brabender mix at 70 rpm, using a 120° C. oil bath, was used for non productive (ingredients –8). Mix time was 5 minutes, and the drop temperature was approximately 118° C. (270° F.).

The non-productive mixes were used for further compounding by reloading the non-productives in the mixer and adding the following ingredients:

| 9. Sulfur | curative | 1.6 |
| 10. N, N' diphenyl guanidine | accelerator | 0.4 |
| 11. 2 (morpholino-thio) benzenethiazole | accelerator | 0.8 |
| 12. Zinc oxide | accelerator | 3 |

Productive mixes (non-productive plus the and vulcanizing agents, (ingredients 9-12) were carried out without external heating at 50 rpm for 3 minutes. The fibers were mixed into the rubber formula at about 60° C. during the productive mixing, and the composition was dumped at approximately 80° C. The compounded elastomers were cured at 150° C. The vulcanizate physical properties of the reinforced elastomer were compared to that of a control compound comprising the above formulation prepared without the addition of a fiber reinforcement containing 75 parts SBR and 25 parts Poly (cis-1,4-isoprene), 45 parts carbon black, processing oil and curatives.

All the examples were prepared using the same procedure, except that the samples made using Natsyn ® rubber only, contained 100 phr Natsyn ® instead of 25 phr Natsyn and 75 phr SBR.

The resulting vulcanized rubber, with the polyethylene/curative fibers, resulted in a 50% rubber modulus increase of 53% and 47% for the 2 and 5 PHR fiber samples. The 50% modulus was increased by 27% and 22% over samples with equivalent amounts of polyethylene fibers without curatives. In all cases the overall amount of curatives was maintained at the same level.

In the table, TS is tensile strength, and EB is the elongation at break in terms of percent of the original length of the elastomer.

The data is summarized in the following table.

TABLE 1

Cure Rheometer and Tensile Data for Rubber Formulation Containing 2 and 5 PHR Curative Loaded Polyethylene Fibers

| Sample | Torque | | | Modulus (MPa) | | | | |
| --- | --- | --- | --- | --- | --- | --- | --- | --- |
| | T5 | T90 | DS | 50% | 100% | 300% | TS | EB |
| 1 | 5.5 | 11.1 | 27.0 | 0.99 | 1.66 | 8.16 | 28.8 | 569 |
| 2 | 5.0 | 18.1 | 29.5 | 1.2 | 1.85 | 8.85 | 24.7 | 572 |
| 3 | 4.8 | 10.5 | 27.0 | 1.23 | 2.31 | 9.20 | 20.2 | 492 |
| 4 | 3.9 | 9.84 | 27.5 | 1.3 | 2.08 | 10.1 | 20.8 | 454 |
| 5 | 4.57 | 15.8 | 29.8 | 1.52 | 2.51 | 10.8 | 12.5 | 332 |
| 6 | 4.39 | 15.0 | 31.2 | 1.46 | 2.96 | — | 8.78 | 248 |

1 = Natsyn Control,
2 = SBR/Natsyn (75/25) Control,
3 = 2PHR in Natsyn,
4 = 5PHR in Natsyn,
5 = 2 PHR in SBR/Natsyn (75/25),
6 = 5 PHR in SBR/Natsyn (75/25)

Natsyn is synthetic natural rubber (cis 1,4-polyisoprene). SBR is styrene butadiene rubber. PHR is parts by weight per 100 parts by weight rubber.

Curatives were easily processed into polyethylene fibers at 20 and 30 weight percent, however disulfide type accelerators did not process into the polyethylene well, and when attempted, a large amount of liquid flowed out of the die. Therefore no disulfide initiators were used in the tests. Instead, a system consisting of a monosulfide initiator and an amine accelerator was used. The die used was a 50 mil die, however the resulting fibers were larger in diameter than 50 mil due to a large amount of die swell. A much smaller diameter is desirable in order to optimize properties.

After mixing in the productive stage, the fibers were visible in the all Natsyn compound, but they were not visible in the 75/25 SBR/Natsyn compound. The SBR sample with 5 PHR fibers shows a significant difference in the amount of cure, as measured by the change in torque on the cure rheometer (Delta S (DS)). None of the other samples showed a significant difference in DS. The modulus values are all increased over the controls and the tensile strength and elongation values are decreased. The large diameter size of the fibers is believed to be the cause for the tensile strength reduction.

Examination of the tensile samples after breakage revealed the appearance of polyethylene at the break surface in every sample. The polyethylene was clear, indicating diffusion of the curatives into the rubber. It is believed that polymers such as chlorinated polyethylene should allow for the preparation of smaller diameter fibers, due to its high drawability, and an improvement in overall properties.

The method of the invention allows for control of cure morphology by placement of curatives into fibers before mixing into rubber. The cure morphology is controlled by the size, shape and distribution of the fibers within the rubber matrix.

While the invention has been specifically illustrated and described, those skilled in the art will recognize that the invention may be modified and practiced without departing from the spirit of the invention. The invention is defined by the scope of the following claims.

What is claimed is:

1. A method of forming domains of high crosslinking density in an elastomer matrix comprising the steps of:
   (a) loading a carrier having a melting point above the mixing temperature of a green elastomer and below the curing temperature of said elastomer with 10% to 40% by weight curing agents,
   (b) forming said carrier into fibers having a diameter of 0.001 to 0.050 inch and an aspect ratio of 1-100,
   (c) mixing said fibers with a green elastomer, and
   (d) curing said elastomer, thereby causing the diffusion of said curatives from said fibers into said elastomer.

2. The method of claim 1 comprising the further step of selecting the carrier of step (a) to be a polyalkylene or substituted polyalkylene, wherein substituents are selected from the group consisting of —F—, —Cl—, —Br—, —I—, —OCH$_3$, -phenyl, and —CH$_3$.

3. The method of claim 1 comprising the further step of selecting said curing agents from the group consisting of sulfur, amine accelerators, sulfenamide accelerators, mon- and disulfide accelerators, stearic acid, zinc oxide, and mixtures thereof.

4. The method of claim 1 further comprising the step of selecting said elastomer to be a rubber selected from the group consisting of polybutadiene, 1,4 polyisoprene, styrene-butadiene, nitrile, and mixtures thereof.

5. The method of claim 1 comprising the further step of selecting the amount of fibers of step (c) to be between 1 and 20 phr.

6. The method of claim 1 which comprises the further step of orienting said domains by causing orientation of said fibers during mixing of said fibers into said elastomer.

7. A elastomeric matrix comprising an elastomeric material having therein domains of high density crosslinking, wherein said domains have a modulus gradient wherein the density of crosslinking at a central region of said domain is higher than the density of crosslinking at an outer portion of said domain.

8. The elastomeric matrix of claim 7 wherein said elastomeric material is a rubber selected from the group consisting of SBR, polybutadiene, 1,4 polyisoprene, nitrile, and mixtures thereof.

9. The elastomeric matrix of claim 7 wherein said domains are oriented and oriented domains cause an increase of 20-50% in the 50% modulus over the same composition without said oriented domains.

10. The elastomer matrix of claim 7 in which the domains have an aspect ratio of 1 to 80.

11. The elastomer matrix of claim 7 in which said domains comprise 1 to 20 volume percent of said matrix.

* * * * *